INVENTOR.
RICHARD H. ANDERSON
ATTORNEYS

Feb. 9, 1971 R. H. ANDERSON 3,561,079
APPARATUS FOR PRESSING OF CLAY PIPE USING
AN ELASTOMERIC MANDREL
Filed March 11, 1968 4 Sheets-Sheet 4

INVENTOR.
RICHARD H. ANDERSON
BY
Baldwin, Egan, Walling & Fetzer.
ATTORNEYS

United States Patent Office 3,561,079
Patented Feb. 9, 1971

3,561,079
APPARATUS FOR PRESSING OF CLAY PIPE USING AN ELASTOMERIC MANDREL
Richard H. Anderson, Dover, Ohio, assignor to The Robinson Clay Product Company, Akron, Ohio, a corporation of Maine
Filed Mar. 11, 1968, Ser. No. 712,152
Int. Cl. B28b 21/20
U.S. Cl. 25—31                                7 Claims

ABSTRACT OF THE DISCLOSURE

A method is provided for forming a length of green clay pipe from granular clay particles wherein the particles are introduced between an elastomeric mandrel and a surrounding generally cylindrical wall of an outer housing, then the mandrel is uniformly expanded outwardly to compress the clay particles into a green clay pipe, which is then removed from the housing. The apparatus provides a thin metallic shell lining the inner face of the housing for the full length of the pipe to be formed, and removal of the formed pipe is facilitated either by (1) slitting the shell from end to end longitudinally along one or more lines extending for its full length and pushing the shell endwise outwardly by power means after the pipe is formed, or (2) by holding the shell slightly compressed radially inward while forming the pipe and thereafter releasing the stress in the shell permitting it to expand and to release the pipe, or (3) by forming the pipe while the shell is cold and thereafter heating the shell electrically or by steam causing it to expand and release the pipe.

---

In the forming of green clay pipe from granular clay particles, it has heretofore been known to press the clay particles radially inwardly using an outer elastomeric bag and inner solid mandrel. An object of the present invention is to reverse this process using an elastomeric mandrel on the inside and pressing against a surrounding housing. This results in a much simpler mechanism, both in original cost and in upkeep, and the disassembly and reassembly in case of bag failure is much simpler. Further, the pump capacity for expanding the elastomeric bag is much less in the case of the present invention than in the prior art method and the pressure seals for the elastomeric bag are much simpler and the sealing of the pressure vessel is not necessary.

Pipes made using the elastomeric mandrel of the present invention are pressed outwardly against a smooth cylindrical surface so that the finished pipe is very smooth and uniform in size and truly cylindrical which renders them much easier to join by conventional means. Some unexpected problems develop in utilizing the present invention and these will be discussed hereinafter.

Other objects and advantages of the invention will be described in the drawings and in the specification and the essential features of this invention will be set forth in the appended claims.

Figure 3:
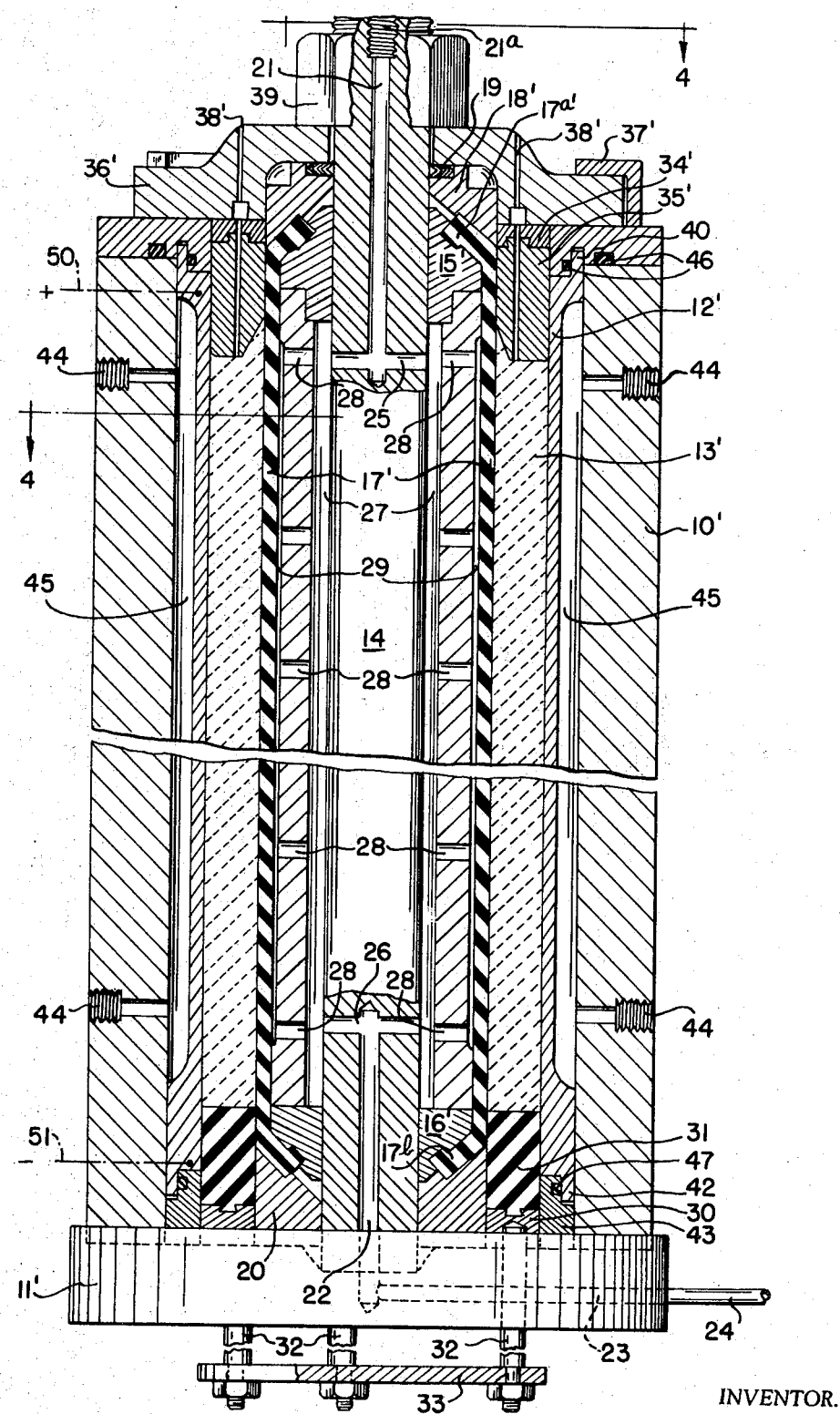
FIG. 3 is a central sectional view of another embodiment of this invention.

Another embodiment is shown in dot-dash lines in FIG. 3; while

Figure 1:
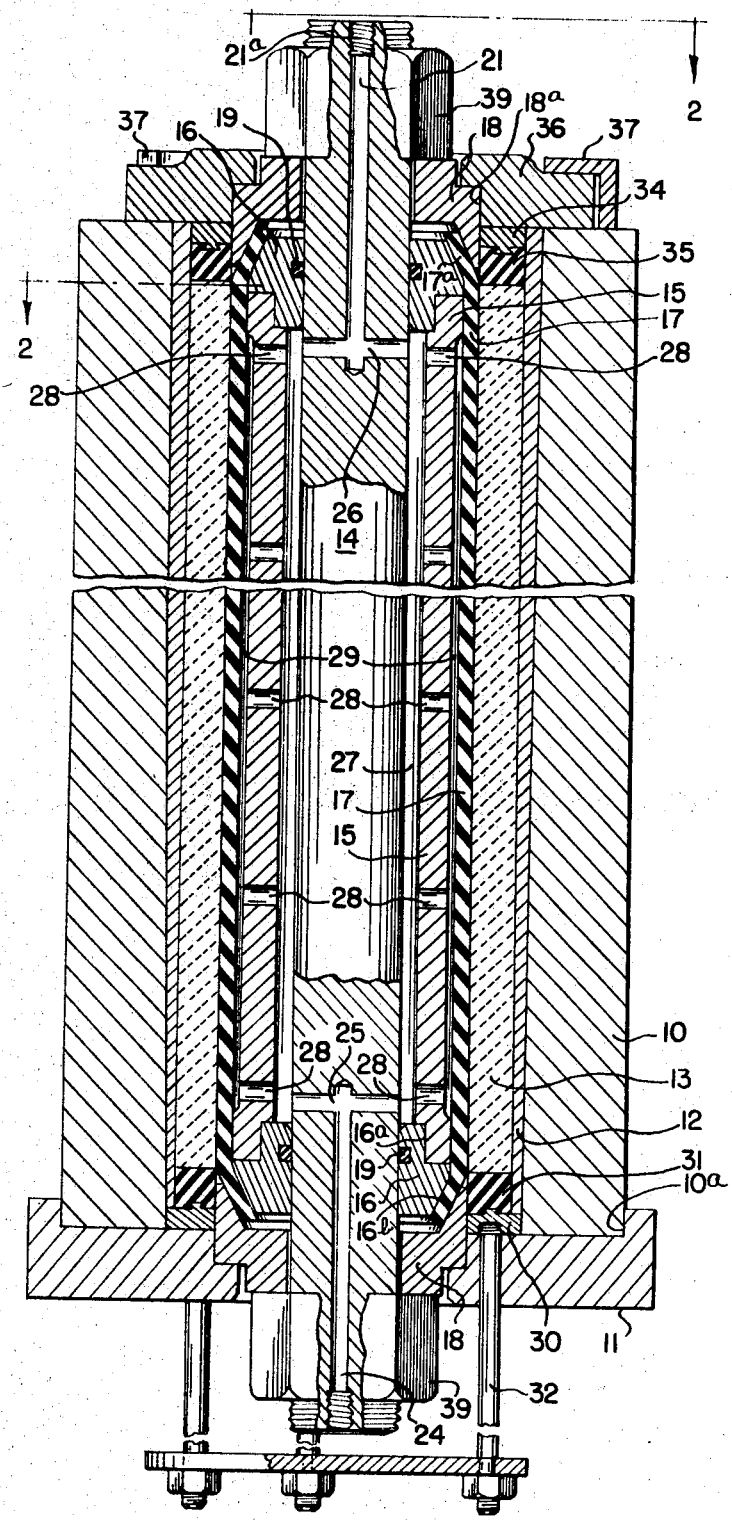
FIG. 1 is a central sectional view through a first embodiment of this invention.

Still another embodiment is shown in dot-dash lines in FIG. 1.

Figure 2:
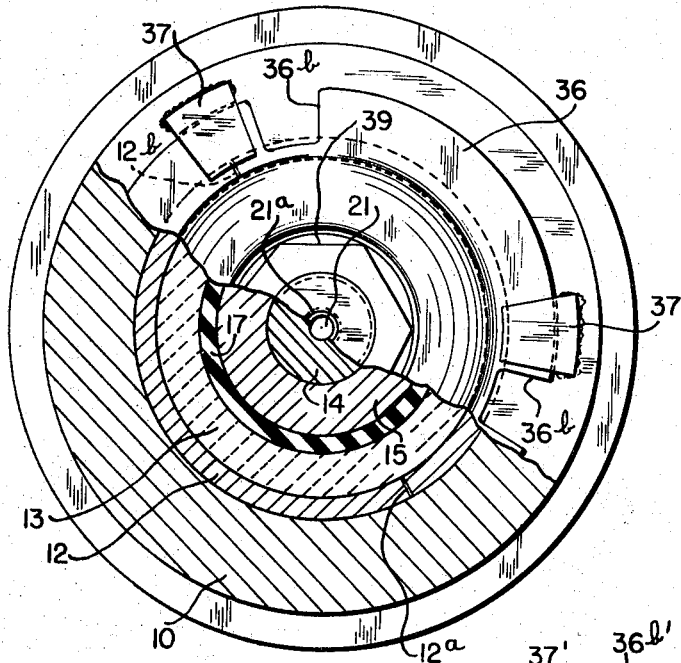
FIG. 2 is a view partly in section and partly in top plan view taken along the line 2—2 of FIG. 1.

In the embodiment shown in FIGS. 1 and 2, a very heavy and strong generally cylindrical housing 10 is inset at 10a into a complementary recess in a base 11. In normal use of this invention, the base 11 would be fixed to a firm support such as a floor. The radially inner face of the housing 10 is lined with a thin shell 12 which is generally cylindrical and extends endwise beyond the length of pipe to be formed therein which is indicated by the annual clay section 13. The radially innermost face 10b of the housing 10 is tapered upwardly and outwardly preferably at an inclination of about 1/16 inch per foot or length, although this taper may vary. The radially outermost face of the shell 12 is complementary to the face 10b of the housing. The radially innermost face of the shell 12 is a smooth cylinder which is the face against which the clay pipe shape is formed.

The mandrel comprises a center stem or strain rod 14 running from top to bottom of the apparatus. Freely surrounding the stem 14 is a hollow bag supporting member 15 held in position as will presently be described. An expandable elastomeric bag 17 between about 1/16 to 1/2 inch in thickness has each of its ends tapered inwardly as indicated at 17a and clamped in postion by a mandrel end plug or ring 16 on the inside and a compression ring 18 on the outside. The ring 16 has an annular shoulder 16a which fits into a complementary surface on the member 15 to hold the same concentric with the stem 14. The tapered surface 16b engages the tapered end of bag 17. An O-ring seal 19 prevents pressure fluid leakage between members 14 and 16. The compression ring 18 has a shoulder 18a holding it concentric either in the base 11 or in the top cap 36. This ring also has a tapered face 18b which coacts with the face 16 to clamp the tapered end of the elastomeric bag firmly in position. When the parts are assembled, a nut 39 threaded on each end of the stem 14 holds all of the parts assembled as shown in FIG. 1.

Means is provided to supply a pressure fluid to the interior face of the bag 17. This is here shown as an inlet passageway 24 at the lower end of the mandrel. Cross passageway 25 leads the pressure fluid radially outwardly through the stem 14 to a chamber 27 between members 14 and 15. This annular chamber communicates with a plurality of radially extending passageways 28, through the member 15, for conducting pressure fluid outwardly to a shallow annular chamber 29 between member 15 and bag 17. It will thus be seen that pressure fluid supplied at 24 will be evenly distributed over the entire area of bag 17 from top to bottom of the clay pipe to be formed. At the end of a pressing operation, the supply of pressure fluid is cut off at 24 and pressure fluid is withdrawn through 24 for reuse. A normally closed outlet 21 at the opposite end of the stem 14 is used as a vent.

At the lower end of the apparatus a push ring 30 is provided between member 20 and housing 10 and a seal 31 having a dovetail connection with the ring 30 seals the lower end of the annular space containing the clay particles 13. For pushing the clay pipe and shell 12 upwardly after the pipe is formed a plurality of push rods 32 are provided, three being shown, connected together by a bracket 33 and power means (not shown) is applied to the bracket 33 and the push rods 32 after a pipe is formed to eject the same from housing 10.

In use, clay particles are provided at 13 between shell 12 and bag 17 until the annular space there is filled. A top closing ring 34 is then put in place as shown in FIG. 1 and it carries with a dovetail connection a seal 35 which tightly closes the upper end of the clay containing chamber. A closure cap 36 is then positioned on top of the housing 10 and having a central bore 36a permitting it to pass over stem 14. A bayonet joint connection is provided to hold cap 36 firmly to the housing 10. For this purpose a plurality, such as three, L-shape retaining member 37 are welded or otherwise rigidly secured to the top housing 10 and cap 36 has three notches 36b which pass over the projections 37, after which the periphery of cap 36 may be twisted beneath the projections 37 so that the entire device is closed and held firmly with all parts in the position shown in FIG. 1.

The use of the apparatus of FIG. 1 should now be clear. With the parts in the position of FIG. 1 with the exception of seat 35, closing ring 34, cap 36 and nut 39, clay particles are passed downwardly between shell 12 and bag 17 in its collapsed position until the device has the required amount of clay material in it. Closing ring 34 and seal 35 are then placed in position, cap 36 is placed in position and turned to holding position beneath projections 37 and nut 39 is threaded on the upper end of stem 14. Hydraulic fluid is then provided under pressure at 24 to move through the various connected passages to the shallow chamber 29 directly radially inside of bag 17 and expands this bag radially outward compressing the clay particles with the force of approximately 6,000 pounds per square inch. When the pipe is formed, the hydraulic fluid is withdrawn sufficiently to permit bag 17 to collapse to the position shown in FIG. 1. Power is then applied to bracket 33 and push rods 32 to push ring 30 upwardly after nut 39 and cap 36 have been removed. As the clay pipe and shell 12 move upwardly out of housing 10, the taper at the face 10b permits the shell to open up at longitudinally extending slit 12a or, if the shell is in two parts, at the longitudinally extending slits 12a and 12b. In the case of a six foot length of pipe, when the pipe is about one foot above the housing 10, it can be grasped with a saddle clamp and the green clay pipe can be lifted away from the housing.

As mentioned previously that difficulties were encountered in pressing the clay pipe during formation radially, one of these difficulties is the tight frictional bond formed between the clay pipe material and the innermost face of shell 12. In order to relieve this friction and to remove the formed green clay pipe from the apparatus of FIG. 1, the first embodiment can be used in either of two ways. In one manner of using the structure of FIG. 1, the shell 12 is split longitudinally from end to end at two diametrically opposite points as shown at 12a and 12b in FIG. 2. This provides two half cylinders which do not have any particular stress but which make a complete cylinder as shown in FIGS. 1 and 2 when assembled inside of the apparatus. However, after the clay pipe is formed as above described, as shell 12 and clay pipe 13 are moved upwardly out of the housing 10, the tapered faces of housing 10 and shell 12 meeting at the face 10b allow the two halves of shell 12 to move outwardly or away from each other so that when the formed pipe is about one-fourth outside of the housing 10, the slits 12a and 12b have opened sufficiently to release the clay pipe so that it may be picked out by the use of a saddle clamp as previously mentioned.

In another use of the embodiment shown in FIGS. 1 and 2, the shell 12 is split from end to end along one line only, say for instance 12a in FIG. 2, and the shell has a spring tension tending to cause the cylindrical shape to open up at the split 12a when tension is released as in the case of a piston ring. In use of this form of the device, the slit 12a is gradually closed as the shell 12 is pushed downwardly into position in the housing 10 because of the tapered face 10b on the radial inward surface of the housing. When the parts are assembled, the shell 12 makes a complete circle and the slit 12a is closed. This arrangement is arrived at by originally forming the shell with the slit along one side only and the shell is of spring tension sufficient to open the slit when stress is not present. Then the shell is compressed to close the slit 12a and the shell 12 is machined to the desired dimensions. In use of this form of the first embodiment, after the clay pipe is formed, the pipe 13 and shell 12 are pushed upwardly out of the housing 10 and after the pipe is about one foot outside of the housing, the spring tension of the shell 12 causes the slit 12a to open sufficiently to release the frictional bond between the shell and the clay pipe so that the latter may be picked out with a saddle clamp.

Figure 4:
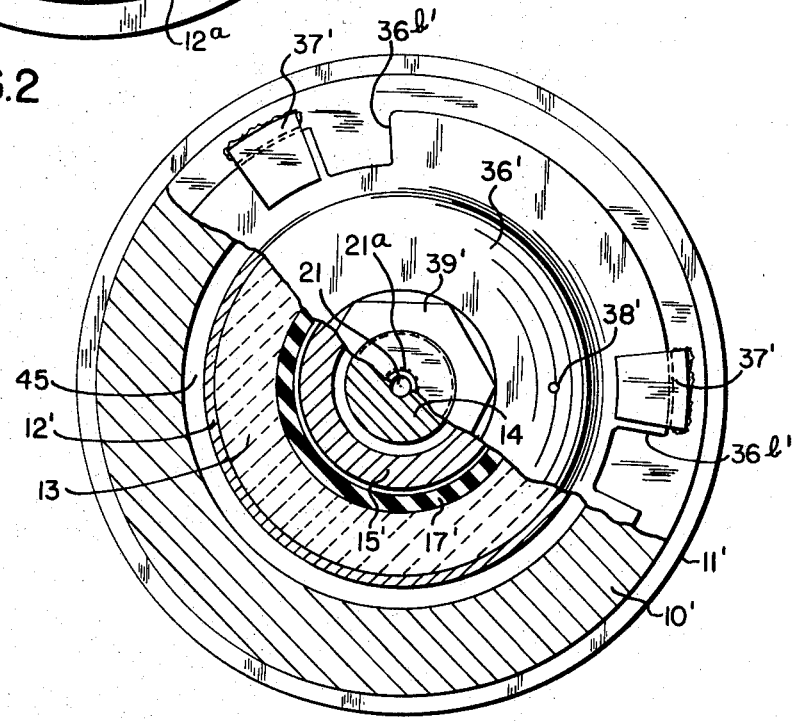
FIG. 4 is a view partly in section and partly in top plan view of the embodiment of FIG. 3.

Referring now to FIGS. 3 and 4, there is shown another embodiment which differs from the first embodiment only in the manner of relieving the frictional bond between the formed pipe and the surrounding sleeve. Parts in FIG. 3 which are like those in FIG. 1 have been given the same reference character. Parts which perform the same function but are slightly different in form have been given the same reference character with a prime suffix.

In FIGS. 3 and 4, the housing 10' is similar to that of the first embodiment except that the lining shell 12' is not directly in contact with the housing 10' for a reason which will presently appear. The elastomeric mandrel comprises a central stem 14 surrounded by an elastomeric bag 17' with means for introducing pressure fluid to expand the elastomeric bag through 21a, 21, 24, 23, 22, 25, 26, 27, 28 and 29 as previously described. The upper end of the bag 17a' is clamped between the members 15' and 18'. The lower end of the bag 17' is clamped between the members 16' and 20. The clay particles are filled into the annular space 13' between bag 17' and shell 12'. The lower end of this annular space is closed by the ejection ring 30 and seal 31. The upper end of the space is closed by the closing ring 34' and the seal 35'. Vents 38' carry out the function of allowing escape of air during the compression of the clay material. Push rods 32 are provided connected by bracket 33 so that power may be applied to lift the clay pipe out of the housing. The shell 12' in this case remains in position when the pick-out is finished. The closing cap 36' is like cap 36 and has cutouts 36b' which can be placed over the angle projections 37' and then rotated to close the bayonet joint lock to hold the cap 36' firmly closing the upper end of the apparatus in FIG. 3. A nut 39 threaded on the upper end of stem 14 holds everything in place.

The chief difference between FIG. 3 and the first described embodiment is that the shell 12' is made of material which may be radially inwardly compressed before the pipe is formed, then the clay material is pressed against the shell 12' in this contracted state until the pipe is completely formed. Then the compressive stress against the shell 12' is released from the outside thereof permitting the shell to return to an unstressed condition which causes its inside diameter to become greater than the outside diameter of the pipe 13' thus releasing the frictional bond so that the pipe may be raised by means of the push rods 32 and the ejection ring 30. Materials which I desire to use for this shell 12' include plastics, such as nylon, or Dowmetal which is a well known high magnesium alloy having 85 percent magnesium or better, or Tobin bronze–452, having a nominal composition of 60 percent copper, 39.25 percent zinc and 0.75 percent tin. These materials are nonmalleable and have a low modulus of elasticity.

Referring to FIGS. 3 and 4, the shell 12' is generally cylindrical having thickened upper and lower edges which are provided at the upper end for a tongue and groove connection 40 with a top ring 41 which is bolted to housing 10' by means not shown. At the bottom, tongue 42 is snugly held between a bottom ring 43 and housing 10'. Means is provided to introduce pressure fluid along substantially the entire vertical length of the shell 12' in order to precompress the same radially inwardly before the clay pipe is formed. To this end, openings 44 are provided through the housing 10' through which pressure fluid is introduced to the annular chamber 45 surrounding the shell 12'. Seals 46 are provided at the upper end of sleeve 12' and seal 47 at the lower end thereof to prevent the escape of pressure out of chamber 45.

In the use of the embodiment shown in FIGS. 3 and 4 as above described, with the elastomeric sleeve 17' in collapsed condition, and with the upper end of the clay cavity open, green clay particles are filled into the cavity between sleeve 17' and shell 12'. Top closing ring 34' and seal 35' are then placed in position as shown, and the closing cap 36' is applied and locked beneath the projections 37', after which nut 39 is threaded down tight against the closing cap. Hydraulic pressure fluid is introduced through the openings 44 to create a heavy pressure on the outer face of the sleeve 12' so as to give a compression inwardly. This compression needs to be only a few hundredths of an inch. Means not shown is provided for so applying the pressure to the openings 44 and for holding the same as long as desired. Pressure fluid is then introduced through the inlet 24 to expand the elastomeric sleeve 17' in the same manner as described in the first embodiment in connection with sleeve 17. When the clay pipe has been compressed, the pressure fluid is relieved from the elastomeric sleeve 17' permitting the same to collapse. The pressure in chamber 45 is then released so as to permit the shell 12' to expand radially outwardly due to the inherent elasticity of the material of the sleeve when the compressive stress is relieved. This sufficiently releases the frictional bond between the newly formed green clay pipe and the sleeve 12' so that power applied to the push rods 32, after the parts above the clay pipe have been removed, will push they clay pipe out of the housing 10' sufficiently so that it may be engaged by a saddle clamp and removed.

Another use of the apparatus shown in FIGS. 3 and 4 provides still another embodiment of this invention. Using the shell 12' either made of the materials discussed in connection with FIG. 3 or of aluminum or Duralumin which is an aluminum alloy containing about 4 percent copper, 0.5 percent magnesium, 0.25 to 1.0 percent manganese and small amounts of iron and silicon. These materials have a high electrical resistance and high thermal expansion when heated. Using such materials and disregarding the chamber 45 and its fluid connections 44, one may attach electrical connections at the top and bottom of the shell 12' for the application of electric current at 50 and 51. In this case, the clay pipe is fomed with shell 12' in a relatively cold or cool condition, as previously described in connection with FIGS. 3 and 4. When the pipe is formed, all parts above the clay pipe at 13' are removed and electrical current of opposite potential is provided between the electrodes 50 and 51 sufficiently to expand the shell 12' a few hundredths of an inch which, of course, will increase its internal diameter. This is sufficient to relieve the frictional bond between the formed green clay pipe and the sleeve 12' so that the push rods 32 are enabled to push the finished clay pipe out the upper end of housing 10' sufficiently so that it may be clamped and removed.

Figure 1A:
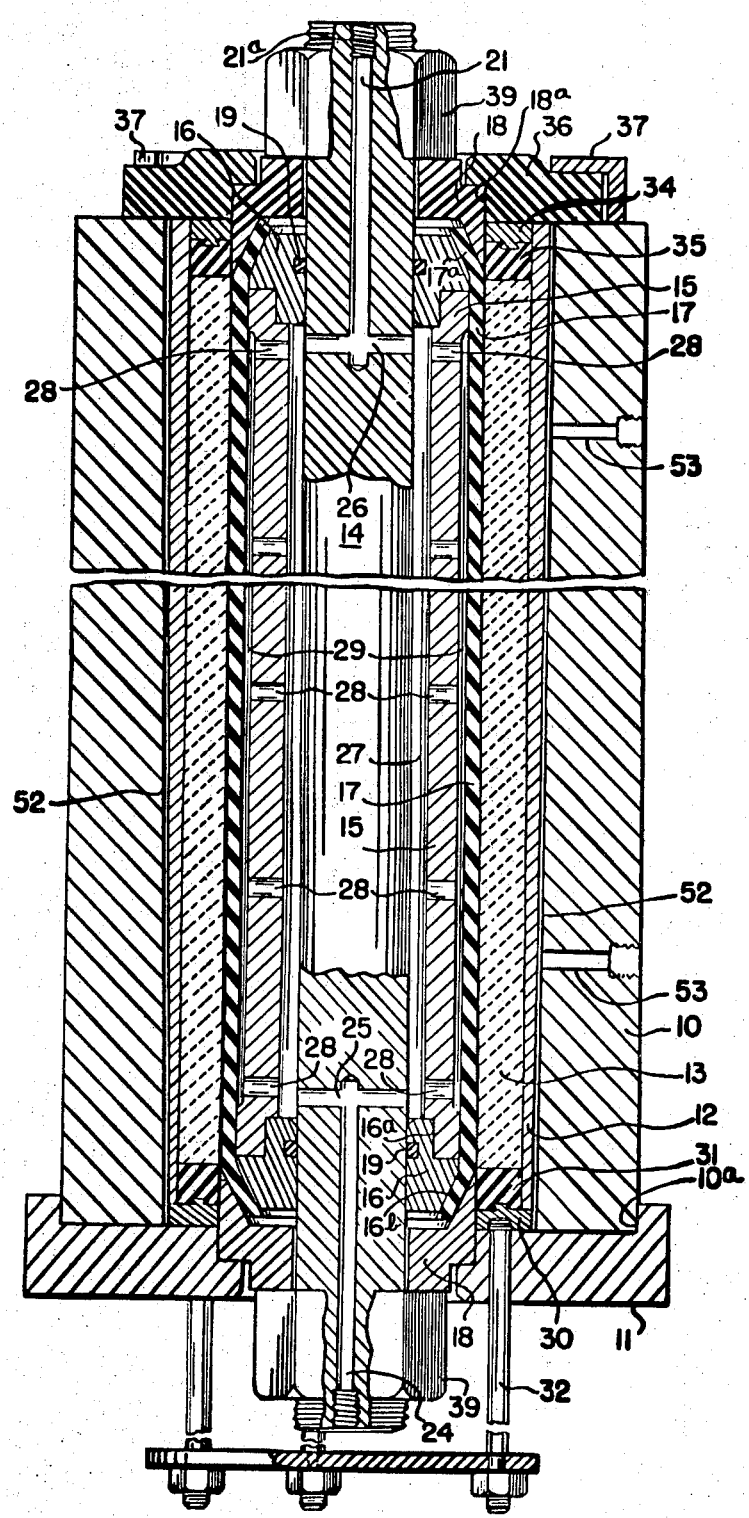
FIG. 1A shows a modification of the first embodiment.

Still another embodiment of this invention is shown in FIG. 1A. This is exactly like the embodiment shown in FIG. 1 except as described in this paragraph. A very shallow annular chamber 52 is provided in the housing 10 completely surrounding the shell 12. This chamber would be of the order of a few thousandths of an inch in radial dimension. Means for introducing steam is indicated at 53 so as to apply and remove steam in the annular chamber 52. In use of this form of the invention, the sleeve 17 would be expanded to compress the green clay pipe against the shell 12 as originally described in connection with FIG. 1. The shell 12 would be thin enough to expand slightly during this compression of the clay pipe. Then when the expansible mandrel is relieved of pressure, the stress in shell 12 would be relieved and the same would contract slightly. Steam would then be introduced at 53 to completely fill the annular space 52 and expand the shell 12 radially outwardly and to some degree to increase the diameter of the housing 10 also by the heat applied. After one pipe has been ejected, the heat is then dissipated by refrigerated water during the next pressing cycle. On pressure release, the steam is introduced and the cycle repeated. This would relieve the frictional bond between the green clay pipe and the radially inner face of shell 12.

The clay particles utilized in this process are preferably between 6 mesh and 100 mesh so that this becomes a powder method rather than a pellet method.

The expansion of the elastomeric bag in the use of this invention increases its diameter by about ½ inch. This invention has been operated satisfactorily with 6,000 pounds per square inch exerted by the pressure fluid on the elastomeric bag. Some of this pressure is lost through the annular space filled with the clap particles but a minimum 5,100 pounds per square inch is exerted in the clay near the stationary surface of the shell surrounding it. We have found that internal lubrication between the clap particles by use of a small amount of water or kerosene increases the final pressure exerted during the pipe forming operation against the stationary outer shell. For this purpose, we prefer to use from zero up to about 8 percent of water or from about one percent to four percent of kerosene. This improves the formation of the pipe.

I claim:

1. Apparatus for forming green clay pipe from granular clay particles consisting of an outside generally cylindrical pressure containing housing having a radially inner face complementary to the diameter of the pipe to be formed; a rigid strain rod positioned concentrically in said housing; an impervious elastomeric sleeve embracing said strain rod for the major portion of the rod length; means sealingly securing the ends of said sleeve to said strain rod; means for introducing and relieving a supply of pressure fluid between said strain rod and said sleeve to compress a green clay pipe; the outside diameter of said sleeve being sufficiently less than the diameter of said radially inner face of said housing to provide an annular space there for the introduction of granular clay particles when said sleeve is in unstressed condition; means for closing the ends of said annular space when the latter is filled with clay particles; means on opposite ends of said strain rod placing said strain rod in tension and securing in place said sleeve end sealing means and said means for closing the ends of said annular space; and means for relieving, after pressing a green clay pipe, the frictional bond between said pipe and said radially inner face of said housing.

2. Apparatus as defined in claim 1 wherein said housing has a separate generally cylindrical rigid shell forming an inner lining therefor and providing said radially inner face against which said green clay pipe is pressed; said shell having a radially inner face which is cylindrical and a radially outer face which tapers from end to end.

3. Apparatus as defined in claim 2, wherein said means for relieving the bond between the pipe and the surrounding housing comprises said shell having two slits dividing said shell from end to end along at least two longitudinal lines; said slits being closed during said introduction of said pressure fluid; and power means adapted to operatively engage the thinner end of said shell to push it at least partially out of said housing.

4. Apparatus as defined in claim 2, wherein said means for relieving the bond between the pipe and the surrounding housing comprises a split in said shell from end to end along a single longitudinal line; said split being closed during said introduction of said pressure fluid; said shell having a spring set urging said shell to part at said line when free to expand; and power means adapted to operatively engage the thinner end of said shell to push it at least partially out of said housing.

5. Apparatus as defined in claim 1, wherein said housing has a separate generally cylindrical rigid shell forming an inner lining therefor and providing said radially inner face against which said green clay pipe is pressed, said shell having a low modulus of elasticity, and said means for relieving the bond between the pipe and the surrounding housing comprises means for compressing said shell radially inwardly while forming said green clay pipe; and means for releasing said compression after said pipe has been formed to permit said shell to increase in diameter sufficiently to release said pipe.

6. Apparatus as defined in claim 1, wherein said housing has a separate generally cyindrical rigid shell forming an inner lining therefor and providing said radially inner face against which said green clay pipe is pressed, said shell having high thermal expansion characteristics, and said means for relieving the bond between the pipe and the surrounding housing comprises means for heating said shell, after said pipe has been formed, sufficiently to increase the shell internal diameter to release said green clay pipe.

7. Apparatus as defined in claim 1, wherein said housing has a separate generally cylindrical rigid shell forming an inner lining therefor and providing said radially inner face against which said green clay pipe is pressed and wherein a radially shallow annular chamber is provided between said shell and said housing permitting said shell to move radially during the operation of pressing sa'd green clay pipe; said shell being of material having high thermal characteristics; and including means for thermally expanding said shell after said pipe is formed.

References Cited

UNITED STATES PATENTS

| | | | |
|---|---|---|---|
| 2,865,078 | 12/1958 | Hasselblad | 25—127 |
| 2,866,250 | 12/1958 | Ford | 25—126X |
| 3,015,855 | 1/1962 | Merkel | 18—Fld. Pres. Dig. |
| 3,107,158 | 10/1963 | Ahlberg | 18—Rub. Mold Dig. |
| 3,163,908 | 1/1965 | Lanmaster | 25—127X |
| 3,176,053 | 3/1965 | Di Stasio | 249—112 |
| 3,184,528 | 5/1965 | Norwalk | 264—314 |
| 3,200,442 | 8/1965 | Haller | 18—Fld. Pres. Dig. |
| 3,239,591 | 3/1966 | Wendt | 25—30(m)X |

J. SPENCER OVERHOLSER, Primary Examiner

B. D. TOBOR, Assistant Examiner

U.S. Cl. X.R.

25—127; 264—314

UNITED STATES PATENT OFFICE
CERTIFICATE OF CORRECTION

Patent No. 3,561,079　　　　　　　　　Dated February 9, 1971

Inventor(s) Richard H. Anderson

It is certified that error appears in the above-identified patent and that said Letters Patent are hereby corrected as shown below:

Column 7, lines 21 and 22, should read: "ing an inner lining therefor and providing said radially inner face against which said green clay pipe is pressed and".

Signed and sealed this 3rd day of August 1971.

(SEAL)
Attest:

EDWARD M.FLETCHER,JR.　　　　　　　WILLIAM E. SCHUYLER,
Attesting Officer　　　　　　　　　　Commissioner of Pater